United States Patent [19]

Lee et al.

[11] Patent Number: 5,326,224
[45] Date of Patent: Jul. 5, 1994

[54] COOLING HOLE ARRANGEMENTS IN JET ENGINE COMPONENTS EXPOSED TO HOT GAS FLOW

[75] Inventors: Ching-Pang Lee, Cincinnati; Theodore T. Thomas, Jr.; Anne M. Isburgh, both of Loveland, all of Ohio

[73] Assignee: General Electric Company, Cincinnati, Ohio

[21] Appl. No.: 801,136

[22] Filed: Dec. 2, 1991

Related U.S. Application Data

[63] Continuation-in-part of Ser. No. 662,662, Mar. 1, 1991, abandoned.

[51] Int. Cl.$^5$ ............................................. F01D 5/18
[52] U.S. Cl. ........................... 416/97 R; 416/90 R; 416/92
[58] Field of Search ............... 416/92, 97 R, 97 A, 416/96 R, 96 A, 95

[56] References Cited

U.S. PATENT DOCUMENTS

| | | | |
|---|---|---|---|
| 3,094,310 | 6/1963 | Bowmer | 253/39.15 |
| 3,111,302 | 7/1963 | Bowmer | 253/39.15 |
| 3,527,543 | 9/1970 | Howald | 416/90 |
| 3,644,059 | 2/1972 | Bryan | 416/97 |
| 3,819,295 | 6/1974 | Hauser et al. | 416/97 |
| 3,934,322 | 1/1976 | Hauser et al. | 29/156.8 H |
| 4,056,332 | 11/1977 | Meloni | 416/97 A |
| 4,221,539 | 9/1980 | Corrigan | 416/97 A |
| 4,247,254 | 1/1981 | Zelahy | 416/97 R |
| 4,297,077 | 10/1981 | Durgin et al. | 416/97 R |
| 4,507,051 | 3/1985 | Lesgourgues et al. | 416/87 R |
| 4,540,339 | 9/1985 | Horvath | 416/92 |
| 4,653,983 | 3/1987 | Vehr | 416/97 R |
| 4,664,597 | 5/1987 | Auxier et al. | 416/97 R |
| 4,669,957 | 6/1987 | Phillips et al. | 416/97 R |
| 4,893,987 | 1/1990 | Lee et al. | 416/92 |
| 4,992,025 | 2/1991 | Stroud et al. | 416/97 R |
| 5,043,553 | 8/1991 | Corfe et al. | 219/121.7 |
| 5,062,768 | 11/1991 | Marriage | 416/97 R |
| 5,096,379 | 3/1992 | Stroud et al. | 416/97 R |

FOREIGN PATENT DOCUMENTS

| | | |
|---|---|---|
| 0375175 | 6/1990 | European Pat. Off. . |
| 221602 | 9/1990 | Japan ............................. 416/97 R |
| 2202907A | 10/1988 | United Kingdom . |

*Primary Examiner*—David H. Brown
*Attorney, Agent, or Firm*—Jerome C. Squillaro; Nathan D. Herkamp

[57] ABSTRACT

A jet engine component includes a body having a wall portion with an external surface exposed to hot gas flow and an internal surface exposed to a cooling air flow. The engine component incorporates an arrangement of cooling holes defined through the wall portion between the external and internal surfaces thereof to permit flow of cooling air from the hollow interior through the wall portion to the exterior of the component. Each cooling hole includes at least one flow inlet at the internal surface of the wall for receiving the cooling air flow, at least a pair of flow outlets at the external surface of the wall for discharging the cooling air flow, and at least a pair of flow branches extending through the wall portion and between the flow inlet and the flow outlets for permitting passage of the cooling air flow from the flow inlet to the flow outlets. In one V-shaped configuration, the flow branches merge and intersect with one another at the flow inlet. In another X-shaped configuration, there are a pair of flow inlets and the flow branches merge and intersect with one another at a location intermediate between and spaced from the flow inlets and outlets. The flow outlets are displaced preferably downstream of the flow inlet relative to the direction of gas flow past the external surface of the wall of the engine component.

55 Claims, 6 Drawing Sheets

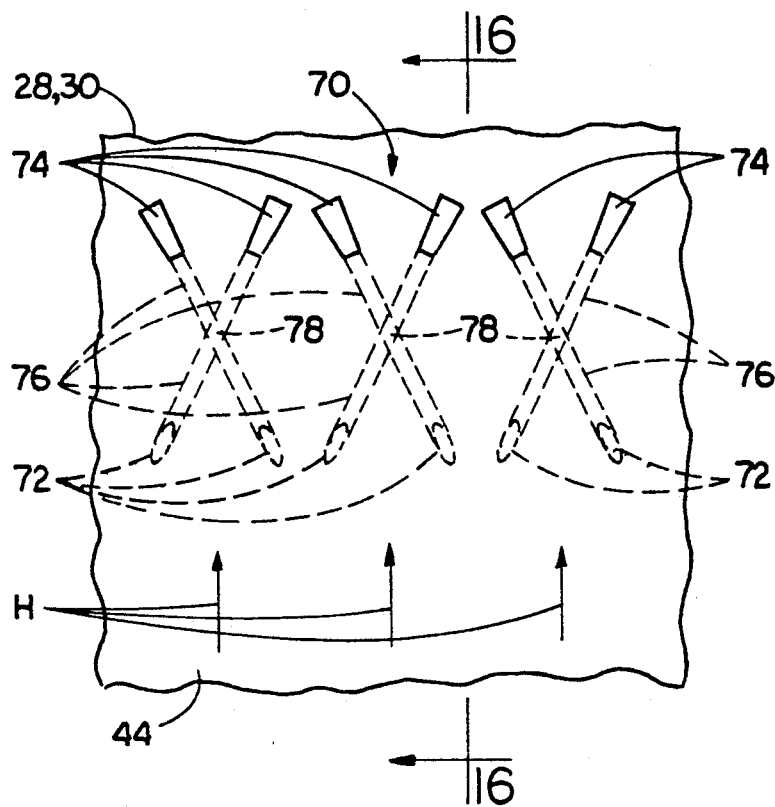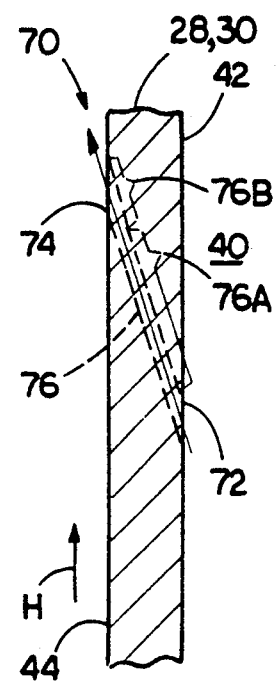
FIG. 15
FIG. 16

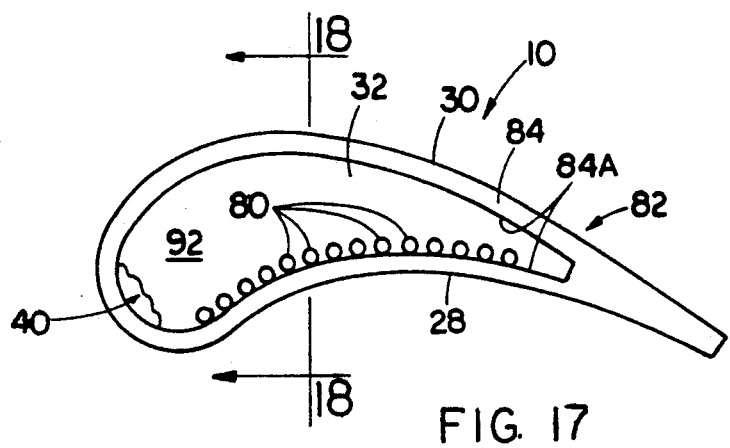
FIG. 17
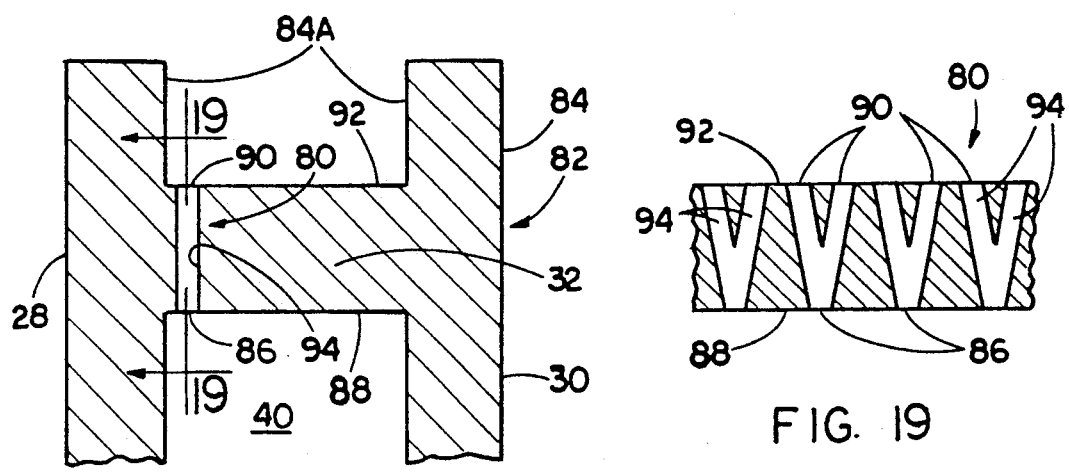
FIG. 18
FIG. 19
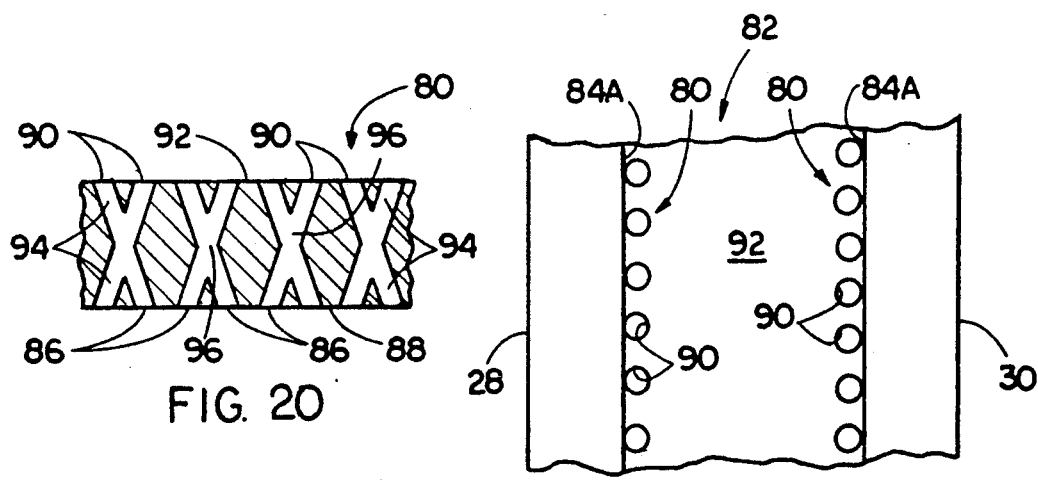
FIG. 20
FIG. 21

COOLING HOLE ARRANGEMENTS IN JET ENGINE COMPONENTS EXPOSED TO HOT GAS FLOW

CROSS REFERENCE TO RELATED APPLICATION

This application is a continuation-in-part of copending U.S. patent application Ser. No. 662,662 filed Mar. 1, 1991, now abandoned.

BACKGROUND OF THE INVENTION

1. Field of the Invention

The present invention relates generally to cooling of jet engine components having a surface exposed to a hot gas flow and, more particularly, to cooling arrangements providing a plurality of holes for passage of fluids for cooling of such components.

2. Description of the Prior Art

Gas turbine engines conventionally comprise an axial flow compressor which compresses air to the proper pressure required for supporting combustion of fuel in a combustion chamber. The combustion gases then pass to a turbine which powers the axial flow compressor. After passing through the turbine, the high energy combustion gas flow may be employed to drive a power turbine which is connected to an output shaft on which may be mounted a propeller, fan or other device. Alternatively, the high energy combustion gas flow may be utilized directly as a thrust to provide motive power, as in turbojet engines commonly used for aircraft.

It is well known that efficiency of jet engines, such as gas turbine, ramjet and scramjet engines used to power aircraft, ships, tanks, electric power generators, etc., increases with increase in temperature of the combustion gas flow. A limiting factor in the gas flow temperature is the high temperature capability of the various jet engine components, such as turbine, stator and rotor airfoils, exposed to a hot gas flow. Various approaches to internally cooling these engine components have been proposed to increase the upper operating temperature capability of the engines.

One advantageous approach is "film cooling" of the jet engine components exposed to the hot gas flow. The term "film cooling" refers to the technique of cooling the external surface of the engine component, being heated by the hot gas flow, by injecting a relatively cooled fluid, such as air, along the external surface. The cooled fluid moves sufficiently slow so that it acts as an insulative layer to reduce unwanted heating of the external surface of the engine component by the adjacent hot gas flow stream.

It is conventional to provide cooling holes and passages through a wall of the engine component to exhaust pressurized cooling air flow from an interior chamber through the wall of the engine component to the exterior surface which is exposed to the hot gas flows. Examples of different arrangements and configurations of cooling holes and passages that have been proposed in the prior art are disclosed in U.S. patents to Howald (3,527,543), Hauser et al (3,819,295 and 3,934,322), Corrigan (4,221,539), Durgin et al (4,297,077), Vehr (4,653,983) and Auxier et al (4,664,597), and in a European patent application to Marriage (EP 0 375 175 Al).

Although the hole and passage configurations of the cited documents are steps in the right direction for providing cooling of engine components exposed to the hot gas flow in order to increase the operating temperature and thereby the efficiency of the jet engines, a need for additional improvement still remains.

SUMMARY OF THE INVENTION

The present invention provides cooling hole arrangements in jet engine components designed to satisfy the aforementioned need. The phrase "jet engine" will be employed hereinafter to include gas turbine, ramjet and scramjet engines. Such jet engines may be used to power flight vehicles, and the gas turbine engine type of jet engine may also be used to power ships, tanks, electric power generators, pipeline pumping apparatus, etc. For purpose of brevity and illustration, cooling hole arrangements of the present invention will be described with respect to film cooling of an aircraft gas turbine engine component using cooling air. However, it is to be understood that the invention is equally applicable to film cooling of other types of jet engines (such as scramjets) and/or to film cooling using other cooling fluids (such as liquid fuel).

The advantages of these arrangements of cooling holes are higher film cooling effectiveness, larger convection cooling area inside the holes, and improved film coverage. The cooling hole arrangements are suitable for use in any jet engine component exposed to a hot gas flow where elevation of its temperature occurs during operation of the engine. The holes of the cooling arrangements can be fabricated by a cost effective laser drilling process.

Accordingly, the present invention is directed to a cooling hole arrangement in a jet engine component which arrangement comprises: (a) a wall portion of the engine component having an external surface exposed to a hot gas flow and an internal surface exposed to a cooling air flow; and (b) means defining at least one and preferably a plurality of holes formed through the wall portion to permit flow of the cooling air through the wall portion from the internal surface to the external surface thereof. Each hole includes a flow inlet at the internal surface of the wall portion for receiving the cooling air flow, at least a pair of flow outlets at the external surface of the wall portion for discharging the cooling air flow, and at least a pair of flow branches extending through the wall portion and between the flow inlet and the flow outlets for permitting passage of the cooling air flow from the flow inlet to the flow outlets.

The holes have generally V-shaped configurations in which the flow branches of each hole merge and intersect with one another at the flow inlet. Alternatively, the holes have generally X-shaped configurations in which each hole includes a pair of flow inlets at the internal surface of the wall portion for receiving the cooling air flow, the flow branches extend through the wall portion and between the flow inlets and the flow outlets and merge and intersect with one another at a location intermediate between and spaced from the flow inlets and flow outlets.

The flow outlets are displaced downstream of the flow inlet relative to the direction of hot gas flow past the external surface of the wall portion of the component. The flow branches extend through the wall portion in inclined relation to the external surface of the wall portion.

Different embodiments of the cooling hole arrangement of the present invention are provided with respect to the holes having generally V-shaped configurations in which the flow branches merge and intersect with one another at the flow inlet. In a first embodiment, the flow branches and flow outlets of each hole are disposed in a plane extending in generally parallel relation to the direction of gas flow past the external surface of the side wall portion. Also, one of the flow branches is shorter in axial length than the other. Further, corresponding ones of the flow outlets of the respective holes are aligned with one another in respective rows extending in generally transverse relation to the direction of gas flow past the external surface of the side wall portion.

In a second embodiment, one of the flow branches of each hole is a primary flow branch and others of the flow branches are secondary flow branches. The primary and secondary flow branches merge and intersect with one another at the flow inlet. Preferably, the primary flow branch has a cross-sectional size that is larger than that of each of the secondary flow branches. Also, the flow outlet of the primary flow branch is displaced downstream of the flow outlets of the secondary flow branches relative to the direction of gas flow past the external surface of the side wall portion. Further, the secondary flow branches are aligned with one another in a plane extending in inclined relation relative to the external surface of the side wall portion and the direction of gas flow past the external surface of the side wall portion.

In a third embodiment, the flow outlets of each hole are aligned in a row extending in generally transverse relation to the direction of gas flow past the external surface of the side wall portion. Also, the flow outlets of the respective holes are aligned with one another in a common row extending in generally transverse relation to the direction of gas flow past the external surface of the side wall portion. Further, the flow branches are substantially equal to one another in axial length and are aligned with one another in a plane extending in inclined relation relative to the external surface of the side wall portion and the direction of gas flow past the external surface of the side wall portion.

By way of examples, the wall portion of the jet engine component with the cooling hole arrangements can be a side wall, tip end wall, or a trailing edge of a turbine blade.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 15 is a view similar to that of FIG. 13 but illustrating cooling holes in the arrangement of the fourth embodiment having a modified configuration in accordance with the present invention.

FIG. 16 is a cross-sectional view taken along line 16—16 of FIG. 15.

FIG. 17 is a top plan view of a turbine blade incorporating cooling holes in accordance with the present invention in the squealer tip end wall of the turbine blade arranged along the pressure side of the blade only.

FIG. 18 is an enlarged fragmentary sectional view of the turbine blade squealer tip taken along line 18—18 of FIG. 17.

FIG. 19 is an enlarged fragmentary sectional view taken along line 19—19 of FIG. 18 illustrating an end wall portion of the turbine blade squealer tip incorporating a fifth embodiment of an arrangement of cooling holes in accordance with the present invention.

FIG. 20 is a view similar to that of FIG. 19 but illustrating a sixth embodiment of an arrangement of cooling holes in accordance with the present invention.

FIG. 21 is an enlarged fragmentary top plan view of the end wall portion of the turbine blade squealer tip illustrating cooling holes in either the fifth or sixth embodiments arranged along both pressure and suction sides of the blade.

DETAILED DESCRIPTION OF THE INVENTION

Figure 1:
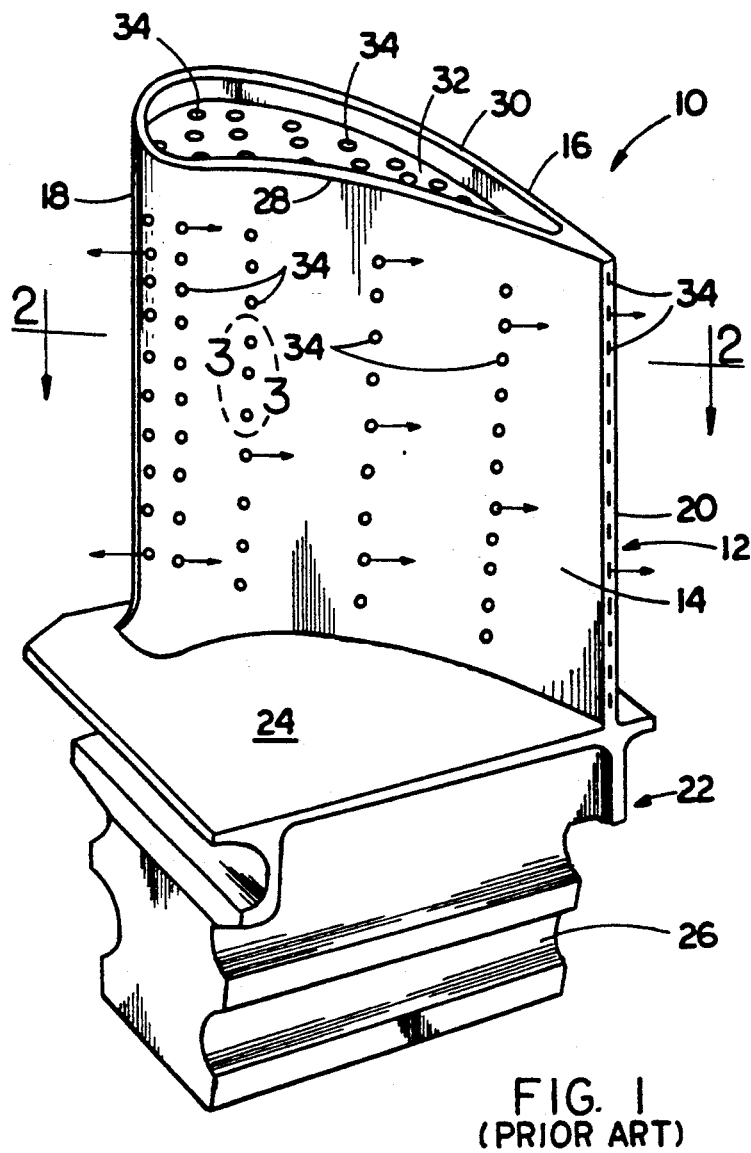
FIG. 1 is a perspective view of a prior art jet engine component in the form of a turbine engine blade having holes in the blade side wall, tip end wall and trailing edge for exit of cooling air therefrom.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Cooling Hole Arrangement

Figure 2:
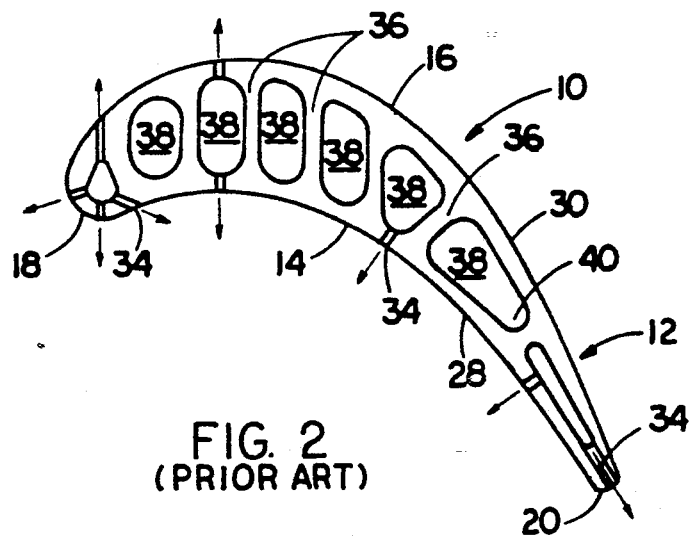
FIG. 2 is an enlarged cross-sectional view of the prior art turbine blade taken along line 2—2 of FIG. 1.

Referring now to the drawings, and particularly to FIGS. 1 and 2, there is illustrated a prior art jet engine component exposed to a hot gas flow, such as by way of example a gas turbine engine hollow blade, generally designated 10. The hollow blade 10 includes an airfoil 12 having respective pressure and suction sides 14, 16 and leading and trailing edges 18, 20, and a base 22 mounting the airfoil 12 to a rotor (not shown) of the engine (not shown). The base 22 includes a platform 24 for rigidly mounting the airfoil 12 and a dovetail root 26 for attaching the blade 10 to the rotor.

The airfoil 12 has opposite side walls 28, 30 defining the pressure and suction sides 14, 16 of the airfoil 12 which merge together at the leading and trailing edges 18, 20 of the airfoil 12 and are rigidly attached upright on the platform 24. The airfoil 12 also has an outer tip end cap or wall 32 which closes the outer ends of the side walls 28, 30. The side walls 28, 30, leading and trailing edges 18, 20, and outer end wall 32 of the airfoil 12 contain small apertures or holes 34 which permit passage and exit of cooling air from the interior to the exterior of the blade airfoil 12.

Cooling air flows into and upwardly through the base 22 of the blade 10 to the airfoil 12. The airfoil 12 includes a plurality of interior spaced ribs or transverse walls 36 (FIG. 2) which extend across the hollow interior of the airfoil 12 and rigidly interconnected with the opposite side walls 28, 30 so as to define a series of interior cavities 38 in the airfoil 12 in a hollow interior chamber 40 of the airfoil. As an example, the ribs 36 can extend vertically and alternately connect to and terminate short of the end cap 32 at their upper ends and of the platform 24 of the base 22. In such fashion, the ribs 36 define serpentine arrangements (not shown) of cavities and passages within the interior of the airfoil 12 causing cooling air to flow along internal serpentine paths and exit through the holes 34 in the side walls 28, 30, leading and trailing edges 18, 20, and end cap 32 of the airfoil 12. Although the cooling holes 34 depicted in FIGS. 3 and 4 and described below are ones formed through the side wall 28 of the blade 10, the following description applies equally to the cooling holes 34 through the leading and trailing edges 18, 20 and the outer tip end wall 32 of the blade 10.

Figure 3:
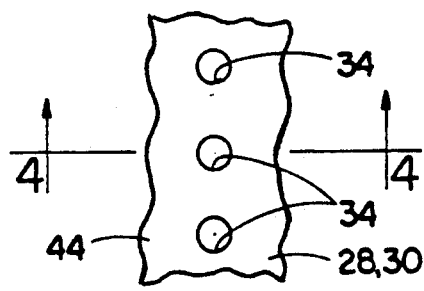
FIG. 3 is an enlarged elevational view of a side wall portion of the prior art blade enclosed by the dashed oval 3—3 of FIG. 1.
Figure 4:
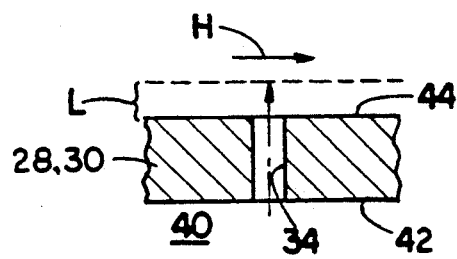
FIG. 4 is a cross-sectional view taken along line 4—4 of FIG. 3.

Referring to FIGS. 3 and 4, the cooling holes 34 typically are circular in cross-section. The cooling holes 34 extending through the side walls 28, 30 between internal and external surfaces 42, 44 of the blade side walls 28, 30 being respectively exposed to cooling air flow and hot gas flow. The cooling holes 34 are axially aligned substantially normal to the internal and external surfaces 42, 44 of the blade side walls 28, 30 and thus to the direction of hot gas flow, being represented by arrow H, passing over and along the external surface 44 of the side walls. In previously cited U.S. Pat. No. 3,527,543 to Howald, assigned to the same assignee as the present invention, cooling holes are shown that are inclined in a direction toward the downstream flow of the hot gas. In the case of both hole configurations, the objective is to achieve film cooling of the external surface 44 of the airfoil 12 by entraining the cooling air exiting the holes 34 within a boundary layer L of low velocity gas that exists between the hot combustion gases, represented by the arrow H which are traveling at high velocity past the airfoil 12, and the airfoil external surface 44 itself.

Cooling Hole Arrangements of the Present Invention

Referring to FIGS. 5-10, there is illustrated three different embodiments of arrangements of cooling holes 46, 48, 50 in accordance with the present invention. These arrangements of cooling holes 46, 48, 50 are suitable for use in any jet engine component exposed to a hot gas flow where elevation of its temperature occurs during operation of the engine. For purposes of brevity and clarity, they are illustrated and described herein in application to the gas turbine engine blade 10. Any of the illustrated arrangements of cooling holes 46, 48, 50 can be substituted in place of the prior art holes 34 in the side walls 28, 30, leading and trailing edges 18, 20 and tip end wall 32 of the airfoil 12 of the blade 10. These cooling holes 46, 48, 50 have configurations which more effectively entrain the cooling air exiting the holes in the boundary layer L of low velocity gas flow and thereby more effectively provide the desired film cooling of the airfoil external surface 44 by avoiding dissipation of the cooling air into the high velocity hot combustion gas flow H.

Referring to FIGS. 5-10, each cooling hole 46, 48, 50 includes a flow inlet 52, 54, 56 defined at the internal surface 42 of the side walls 28, 30 communicating with the hollow interior chamber 40 for receiving the cooling air flow, at least a pair of flow outlets 58, 60, 62 defined at the exterior surface 44 of the side walls 28, 30 for discharging the cooling air flow, and at least a pair of flow branches 64, 66, 68 extending through the side walls 28, 30 between the flow inlet 52, 54, 56 and the flow outlets 58, 60, 62 for permitting passage of the cooling air flow from the flow inlet 52, 54, 56 to the flow outlets 58, 60, 62.

The flow branches 64, 66, 68 merge and intersect with one another at the flow inlet 52, 54, 56 so as to provide the cooling holes 46, 48, 50 with generally V-shaped configurations. The flow inlet 52, 54, 56, flow outlets 58, 60, 62 and flow branches 64, 66, 68 are preferably circular in cross-section. The flow branches 64, 66, 68 are substantially straight, of uniform cross-sectional size, and overall define right cylinders. The flow outlets 58, 60, 62 are displaced preferably downstream of the flow inlet 52, 54, 56 relative to the direction of gas flow H past the external surface 44 of the side walls 28, 30 of the component 10. Also, the flow branches 64, 66, 68 extend through the side walls 28, 30 in inclined relation to the internal and external surfaces 42, 44 of the side walls 28, 30 and to the direction of gas flow H past the external surface 44 of the side walls 28, 30.

Figure 5:
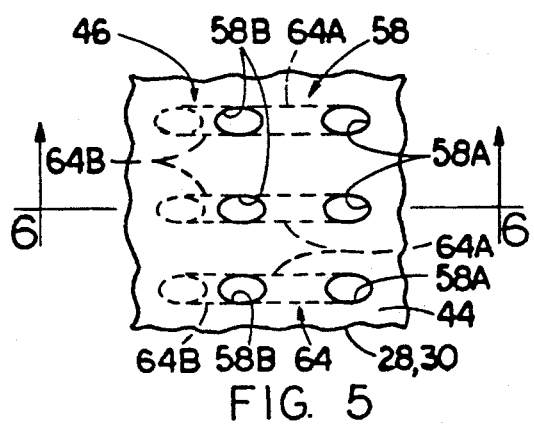
FIG. 5 is a view similar to that of FIG. 3 but illustrating a first embodiment of an arrangement of cooling holes in accordance with the present invention.
Figure 6:
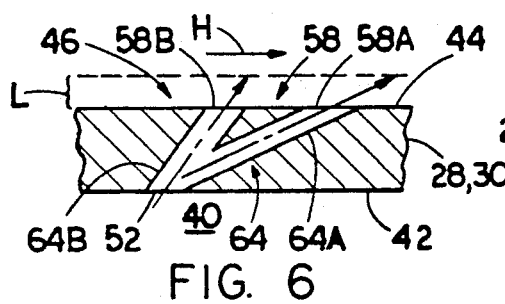
FIG. 6 is a cross-sectional view taken along line 6—6 of FIG. 5.

Referring to the first embodiment of FIGS. 5 and 6, the pairs of flow branches 64 and flow outlets 58 of each cooling hole 46 are disposed in a plane extending in generally parallel relation to the direction of gas flow H past the external surface 44 of the side walls 28, 30 of the component 10. Further, one of the flow branches 64A is preferably longer in axial length than the other flow branch 64B. The flow outlet 58A of the longer flow branch 64A is displaced preferably downstream of the flow outlet 58B of the shorter flow branch 64B relative to the direction of gas flow H past the external surface 44 of the side walls 28, 30. Also, corresponding ones of the flow outlets 58 of the respective cooling holes 46 are aligned with one another in respective rows extending in generally transverse relation to the direction of gas flow H past the external surface 44 of the side walls 28, 30. Further, corresponding ones of the flow branches 64A, 64B are aligned with one another in planes extending in different inclined relations relative to the internal and external surfaces 42, 44 of the side walls 28, 30 and the direction of gas flow H past the external surface 44 of the side walls. The plane of the shorter flow branches 64B is at a steeper incline than the plane of the longer flow branches 64A.

Figure 7:
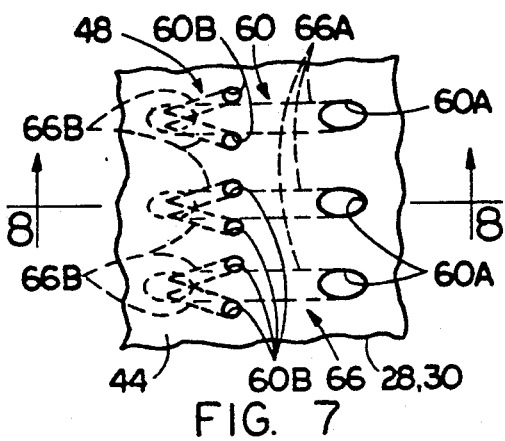
FIG. 7 is a view similar to that of FIG. 5 but illustrating a second embodiment of an arrangement of cooling holes in accordance with the present invention.
Figure 8:
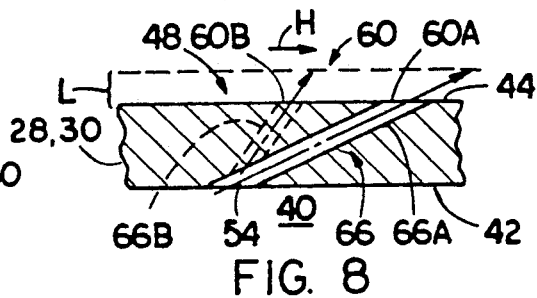
FIG. 8 is a cross-sectional view taken along line 8—8 of FIG. 7.

Referring to the second embodiment of FIGS. 7 and 8, flow branch 66A, which in the preferred embodiment is the longest one of the flow branches 66 of each cooling hole 48, is a primary flow branch and the other flow branch 66B is split into a pair of secondary flow branches 66B together having a V-shaped configuration. The primary flow branch 66A and outlet 60A have a cross-sectional size that is preferably larger than that of each of the secondary flow branches 66B and outlets 60B. Further, the flow outlet 60A of the primary flow branch 66A is displaced preferably downstream of the flow outlets 60B of the secondary flow branches 66B relative to the direction of gas flow H past the external surface 44 of the side walls 28, 30 of the component 10. Also, the secondary flow branches 66B are aligned with one another in a plane extending in inclined relation relative to the internal and external surfaces 42, 44 of the side walls 28, 30 and the direction of gas flow H past the external surface 44 of the side walls. The plane of the secondary flow branches 66B is at a steeper incline than the plane defined by the primary flow branches 66A.

Figure 9:
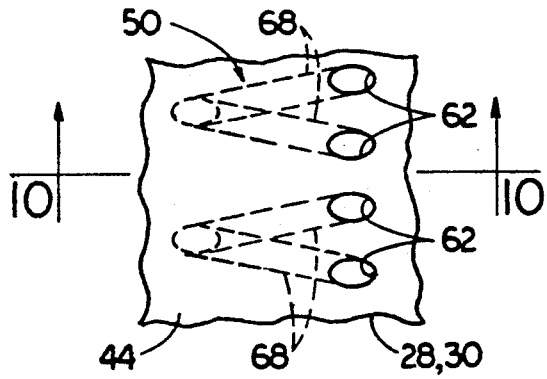
FIG. 9 is a view similar to that of FIG. 7 but illustrating a third embodiment of an arrangement of cooling holes in accordance with the present invention.
Figure 10:
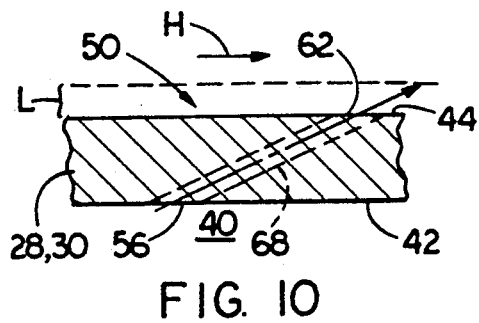
FIG. 10 is a cross-sectional view taken along line 10—10 of FIG. 9.

Referring to the third embodiment of FIGS. 9 and 10, the flow outlets 62 of each cooling hole 50 are preferably aligned with one another in a common row extending in generally transverse relation to the direction of gas flow H past the external surface 44 of the side walls 28, 30 of the component 10. Further, the flow branches 68 are preferably substantially equal to one another in axial length, and together have a V-shaped configuration. Also, the flow branches 68 are aligned with one another in a plane extending in inclined relation relative to the internal and external surfaces 42, 44 of the side walls 28, 30 and the direction of gas flow H past the external surface 44 of the side walls.

Figures 11, 12:
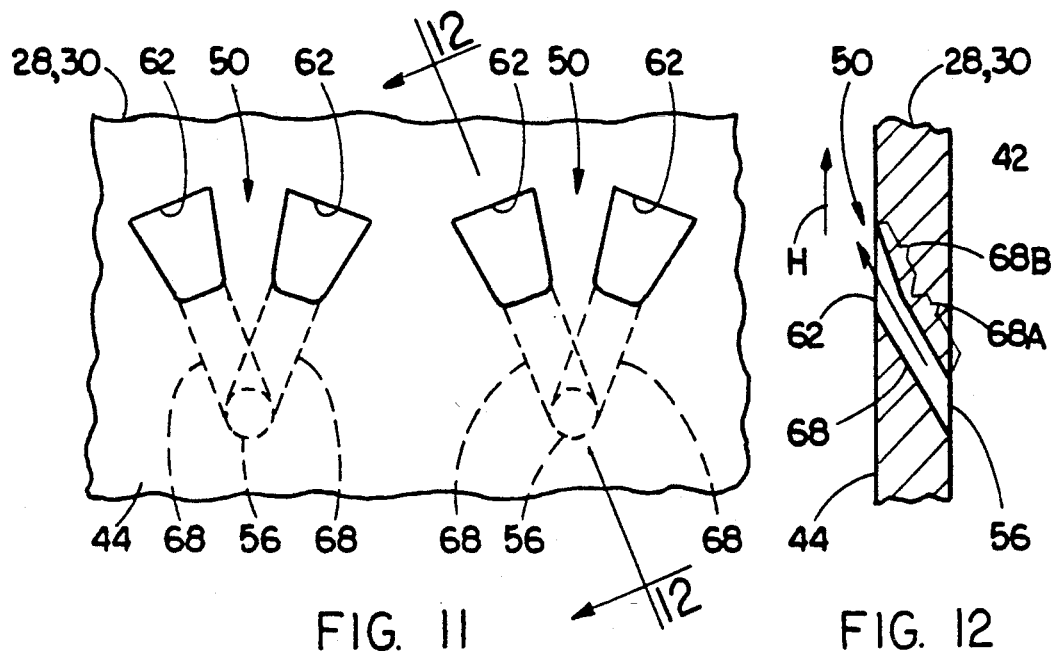
FIG. 11 is a view similar to that of FIG. 9 but illustrating cooling holes in the arrangement of the third embodiment having a modified configuration in accordance with the present invention.
FIG. 12 is a cross-sectional view taken along line 12—12 of FIG. 11.

Referring to FIGS. 11 and 12, there is illustrated a modification in the configuration of the cooling holes 50 in the arrangement of the third embodiment of FIGS. 9 and 10. The flow branches 68 of the cooling holes 50 now have inlet sections 68A of uniform cross-section as they merge from the flow inlet 56 which are unmodified from the third embodiment of FIGS. 9 and 10. However, the flow branches 68 have outlet sections 68B of divergently flared cross-section as they merge into the flow outlets 62. Their flared shapes serve to diffuse the cooling air flow discharging from the flow outlets 62 and thereby prevent blow off of the film from the external surface 44. Both film coverage and attachment are further improved. The flared shaped flow branch sections 68B can be fabricated by the laser drilling process and the shape of the flare can be any configuration, such as, conical, two dimensional and/or a three dimensional shape.

Figures 13, 14:
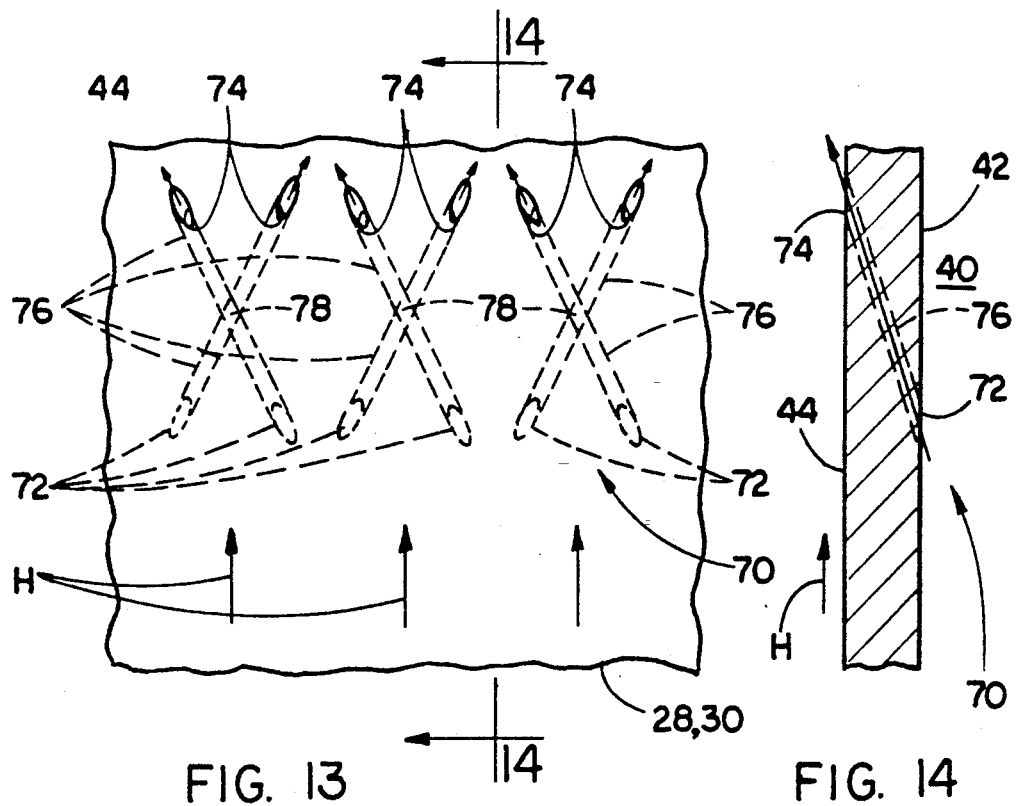
FIG. 13 is a view similar to that of FIG. 9 but illustrating a fourth embodiment of an arrangement of cooling holes in accordance with the present invention.
FIG. 14 is a cross-sectional view taken along line 14—14 of FIG. 13.

Referring to FIGS. 13 and 14, there is illustrated a fourth embodiment of an arrangement of cooling holes 70 in accordance with the present invention. This arrangement of cooling holes 70 is also suitable for use in any jet engine component exposed to hot gas flow where elevation of its temperature occurs during operation of the engine. This arrangement of cooling holes 70 also can be substituted in place of the prior art holes 34 in the side walls 28, 30, leading and trailing edges 18, 20 and the tip end wall 32 of the blade 10.

Each cooling hole 70 includes a pair of flow inlets 72 defined at the internal surface 42 of the side walls 28, 30 and communicating with the hollow interior chamber 40 for receiving the cooling air flow, a pair of flow outlets 74 defined at the exterior surface 44 of the side walls 28, 30 for discharging the cooling air flow, and a pair of flow branches 76 extending through the side walls 28, 30 between the respective flow inlets 72 and the flow outlets 74 for permitting passage of the cooling air flow from the flow inlets 72 to the flow outlets 74. The flow branches 76 are substantially the same in their respective configurations and in their respective orientation to the internal and external surfaces 42, 44 as the flow branches 68 of the third embodiment of FIGS. 9 and 10 except that the flow branches 76 merge and intersect with one another at a location 78 disposed intermediate between the flow inlets 72 and flow outlets 74.

Referring to FIGS. 15 and 16, there is illustrated a modification in the configuration of the cooling holes 70 in the arrangement of the fourth embodiment of FIGS. 13 and 14. The flow branches 76 of the cooling holes 70 now have inlet sections 76A of uniform cross-section as they merge from the flow inlet 72 which are unmodified from the fourth embodiment of FIGS. 13 and 14. However, the flow branches 76 have outlet sections 76B of divergently flared cross-section as they merge into the flow outlets 74. Their flared shapes serve to diffuse the cooling air flow discharging from the flow outlets 74 and thereby prevent blow off of the film from the external surface 44. Both film coverage and attachment are further improved. As with the modification described above with regards to the FIG. 12 embodiment, the flared shaped flow branch sections 76B can be fabricated by the laser drilling process and the shape of the flare can be any flared configuration.

Referring to FIGS. 17 and 18, there is illustrated a turbine blade 10 incorporating an arrangement of cooling holes 80 formed through an end cap or wall 32 of a squealer tip 82 of the blade 10 in accordance with either a fifth embodiment of the present invention shown in FIG. 19 or a sixth embodiment of the present invention shown in FIG. 20. The squealer tip 82 includes the outer end wall 32 which closes the outer end of the blade 10, and a wall edge 84 attached to, extending along the periphery of, and projecting outwardly from, the end wall 32.

The cooling holes 80 are defined through the outer end wall 32 in communication with the hollow interior chamber 40 of the blade 10 through which cooling air flows in a conventional manner. The cooling holes 80 permit passage of cooling air flow from the interior chamber through the end wall 32 for the purposes of cooling the blade squealer tip 82. The cooling holes 80 are spaced apart from each other and located adjacent to the interior surface 84A of the wall edge 84. As seen in FIGS. 17 and 18, it is preferred that the cooling holes 80 be provided in a row at least along the pressure side wall 28 of the blade 10 which is the hottest portion of the blade 10. FIG. 21 illustrates the same cooling holes 80 arranged in rows along both pressure and suction side walls 28, 30 of the blade 10.

Fifth and sixth embodiments of the cooling holes 80 of the present invention are illustrated respectively in FIGS. 19 and 20. In the fifth embodiment shown in FIG. 19, each hole 80 has a generally V-shaped configuration. The hole 80 is composed of a flow inlet 86 defined at an internal surface 88 of the outer end wall 32 and communicating with the hollow interior chamber 40, a pair of flow outlets 90 defined at an external surface 92 of the outer end wall 32, and a pair of flow branches 94 extending through the outer end wall 32 between the flow inlet 86 and the flow outlets 90. The flow branches 94 merge and intersect with one another as they approach and arrive at the flow inlet 86. Also, in the fifth embodiment, the flow inlet 86 has an area that is smaller than the combined areas of the flow outlets 90. Flow is thus controlled by the minimum flow area at the inlet. (The same is true in the case of the earlier described first, second and third embodiments.) The flow branches 94 are substantially straight and of uniform cross-sectional size. Preferably, the cross-section of each flow branch 94 is circular and overall defines a right cylinder.

In the sixth embodiment shown in FIG. 20, the difference is that each hole 80 has a generally X-shaped configuration as opposed to the V-shaped configuration in FIG. 20. Thus, the hole 80 is composed of a pair of flow inlets 86 (as opposed to just one) and the flow branches 94 merge and intersect with one another at a location or region 96 disposed intermediate between and spaced from the flow inlets 86 and flow outlets 90. The region of intersection 96 of the flow branches 94 has an area that is smaller than the area of each of the flow inlets 86 and flow outlets 90. Thus, the region of intersection 96 which is the minimum flow area controls the metering of cooling air flow.

The included angle defined by the flow branches 94 of the FIG. 19 and FIG. 20 configurations is within the range of approximately 30 to 90 degrees. Also, the holes 80 of both configurations are aligned in rows extending generally parallel to the peripheral wall edge 84 of the squealer tip 82. Furthermore, the holes 80 of both configurations can be fabricated by a cost effective technique involving two laser shots.

Figure 22:
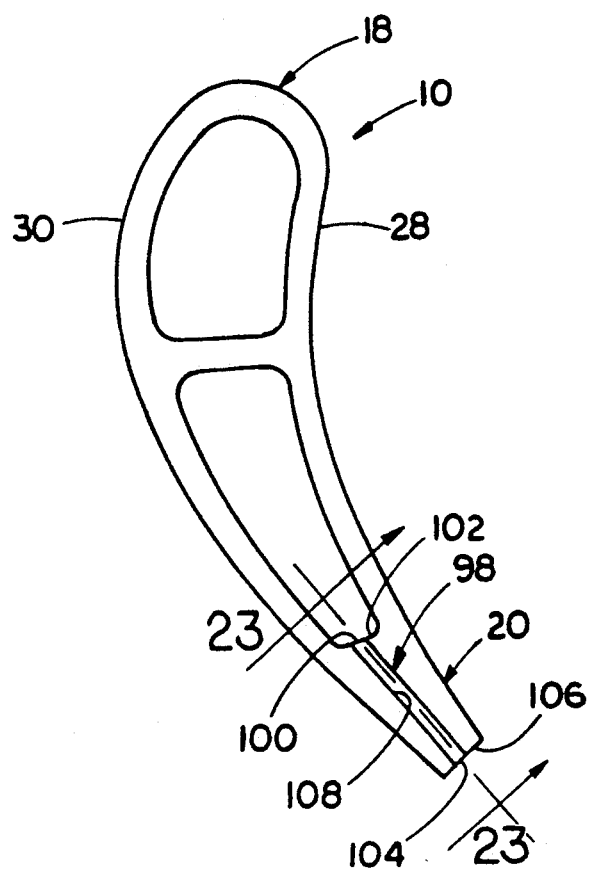
FIG. 22 is a cross-sectional view of a turbine blade incorporating cooling holes in accordance with the present invention in the trailing edge portion of the blade.
Figure 23:
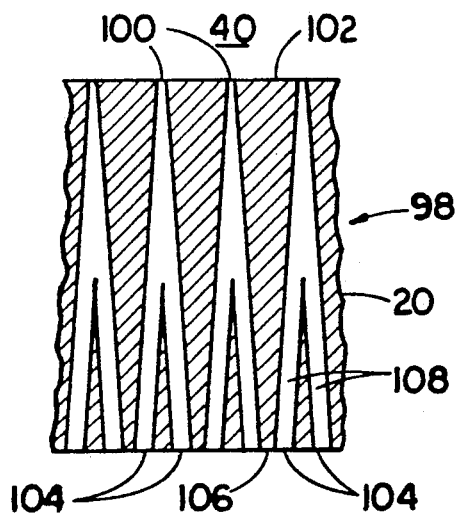
FIG. 23 is an enlarged fragmentary sectional view taken along line 23—23 of FIG. 22 illustrating the trailing edge portion of the turbine blade incorporating cooling holes in the arrangement of the fifth embodiment of FIG. 19.
Figure 24:
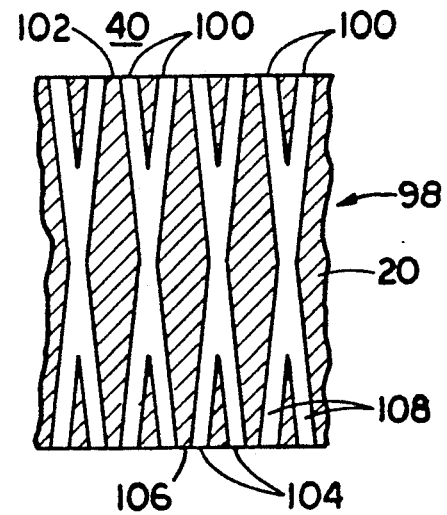
FIG. 24 is a view similar to that of FIG. 23 but illustrating the trailing edge portion of the turbine blade incorporating cooling holes of the arrangement in the sixth embodiment of the cooling hole arrangement of FIG. 20.

Referring to FIGS. 22-24, there is illustrated arrangements of cooling holes 98 having the respective V-shaped and X-shaped configurations of FIGS. 19 and 20 formed through the trailing edge 20 of the turbine blade 10. The cooling holes 98 are virtually identical in composition to the fifth and sixth embodiments of the holes 80 as described above in relation to FIGS. 19 and 20 and so the description of the holes 98 need not be repeated. Suffice it to say that the holes 98 are composed of at least one flow inlet 100 defined at an internal surface 102 of the trailing edge 20 and communicating with the hollow interior chamber 40, a pair of flow outlets 104 defined at an external surface 106 of the trailing edge 20, and a pair of flow branches 108 extending through the trailing edge 20 between the flow inlet or inlets 100 and the flow outlets 104. The flow branches 108 merge and intersect with one another.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. A cooling hole arrangement in a jet engine component, comprising:
    (a) a wall portion of said component having an external surface exposed to a hot gas flow and an internal surface exposed to a cooling air flow; and
    (b) means defining at least two separate holes formed in spaced non-communicative flow relation to one another through said wall portion to permit flow of the cooling air through said wall portion from said internal surface to said external surface thereof;
    (c) each of said separate holes including at least one flow inlet formed at said internal surface of said wall portion for receiving the cooling air flow, at least a pair of flow outlets formed at said external surface of said wall portion for discharging the cooling air flow, and at least a pair of flow branches extending through said wall portion and between said flow inlet and said flow outlets for permitting passage of the cooling air flow from said flow inlet to said flow outlets.

2. The arrangement as recited in claim 1, wherein said flow branches merge and intersect with one another at said flow inlet to define said hole in a generally V-shaped configuration.

3. The arrangement as recited in claim 1, wherein said hole includes a pair of flow inlets at said internal surface of said wall portion for receiving the cooling air flow, said flow branches extending through said wall portion and between said flow inlets and said flow outlets, said flow branches merging and intersecting with one another at a location intermediate between and spaced from said flow inlets and outlets to define said hole in a generally X-shaped configuration.

4. The arrangement as recited in claim 1, wherein said flow outlets are displaced downstream of said flow inlet relative to the direction of hot gas flow past said external surface of said wall portion of said component.

5. The arrangement as recited in claim 1, wherein said flow branches extend through said wall portion in inclined relation to said external surface of said wall portion.

6. The arrangement as recited in claim 1, wherein said flow branches are disposed in a plane extending in generally transverse relation to said external surface of said wall portion.

7. The arrangement as recited in claim 1, wherein one of said flow branches is shorter in axial length than the other of said flow branches.

8. The arrangement as recited in claim 1, wherein said flow branches have inlet sections of uniform cross-section merging from said flow inlet and outlet sections of divergently flared cross-section merging from said inlet sections and into said flow outlets.

9. The arrangement as recited in claim 1, wherein said flow outlets are aligned with one another in a row extending in generally parallel relation to the direction of gas flow past said external surface of said wall portion.

10. The arrangement as recited in claim 1, wherein said flow outlets are aligned with one another in a row extending in generally transverse relation to the direction of gas flow past said external surface of said wall portion.

11. The arrangement as recited in claim 1, wherein said flow branches are aligned with one another in a plane extending in inclined relation relative to said external surface of said wall portion.

12. The arrangement as recited in claim 1, wherein said flow branches are substantially equal to one another in axial length.

13. The arrangement as recited in claim 1, wherein said wall portion of the jet engine component is a side wall of a turbine blade.

14. The arrangement as recited in claim 1, wherein said wall portion of the jet engine component is an outer tip end wall of a turbine blade.

15. The arrangement as recited in claim 1, wherein said wall portion of the jet engine component is a trailing edge of a turbine blade.

16. The arrangement is recited in claim 1, wherein one of said flow branches is a primary flow branch and the others of said flow branches are secondary flow branches.

17. The arrangement as recited in claim 16, wherein said primary flow branch has a cross-sectional size that is larger than that of each of said secondary flow branches.

18. The arrangement as recited in claim 16, wherein said flow outlet of said primary flow branch is displaced downstream of said flow outlets of said secondary flow branches relative to the direction of gas flow past said external surface of said wall portion.

19. wherein said secondary flow branches are aligned with one another in a plane extending in inclined relation relative to said external surface of said wall portion.

20. A jet engine component, comprising:
   (a) a body having a wall portion with an external surface exposed to a hot gas flow and an internal surface exposed to a cooling air flow; and
   (b) a cooling hole arrangement including means defining a plurality of separate holes formed in spaced non-communicative flow relation to one another through said wall portion of said body to permit flow of the cooling air through said wall portion from said internal surface to said external surface thereof;
   (c) each of said separate holes including at least one flow inlet formed at said internal surface of said wall portion for receiving the cooling air flow, at least a pair of flow outlets formed at said external surface of said wall portion for discharging the cooling air flow, and at least a pair of flow branches extending through said wall portion and between said flow inlet and said flow outlets for permitting passage of the cooling air flow from said flow inlet to said flow outlets.

21. The arrangement as recited in claim 20, wherein said flow branches of each said hole merge and intersect with one another at said flow inlet to define said hole in a generally V-shaped configuration.

22. The arrangement as recited in claim 20, wherein each said hole includes a pair of flow inlets at said internal surface of said wall portion for receiving the cooling air flow, said flow branches extending through said wall portion and between said flow inlets and said flow outlets, said flow branches merging and intersecting with one another at a location intermediate between and spaced from said flow inlets and outlets to define said hole in a generally X-shaped configuration.

23. The arrangement as recited in claim 20, wherein said flow outlets of each said hole are displaced downstream of said flow inlet relative to the direction of gas flow past said external surface of said wall portion.

24. The arrangement as recited in claim 20, wherein said flow branches of each said hole extend through said wall portion in inclined relation to said external surface of said wall portion.

25. The arrangement as recited in claim 20, wherein one of said flow branches of each said hole is shorter in axial length than the other of said flow branches.

26. The arrangement as recited in claim 20, wherein said flow branches have inlet sections of uniform cross-section merging from said flow inlet and outlet sections of divergently flared cross-section merging from said inlet sections and into said flow outlets.

27. The arrangement as recited in claim 20, wherein said flow outlets of each said hole are aligned in a row extending in generally parallel relation to the direction of gas flow past said external surface of said wall portion.

28. The arrangement as recited in claim 20, wherein corresponding ones of said flow outlets of said respective holes are aligned with one another in respective rows extending in generally transverse relation to the direction of gas flow past said external surface of said wall portion.

29. The arrangement as recited in claim 20, wherein said flow outlets of each said hole are aligned in a row extending in generally transverse relation to the direction of gas flow past said external surface of said wall portion.

30. The arrangement as recited in claim 20, wherein said flow outlets of said respective holes are aligned with one another in a common row extending in generally transverse relation to the direction of gas flow past said external surface of said wall portion.

31. The arrangement as recited in claim 20, wherein said flow branches of each said hole are aligned with one another in a plane extending in inclined relation to said external surface of said wall portion.

32. The arrangement as recited in claim 20, wherein said flow branches of each said hole are substantially equal to one another in axial length.

33. The arrangement as recited in claim 20, wherein said body of said jet engine component is a turbine blade and said wall portion is a side wall of said blade.

34. The arrangement as recited in claim 20, wherein said body of said jet engine component is a turbine blade and said wall portion is an end wall of an outer tip of said blade.

35. The arrangement as recited in claim 20, wherein said body of said jet engine component is a turbine blade and said wall portion is a trailing edge of said blade.

36. The arrangement as recited in claim 20, wherein one of said flow branches of each said hole is a primary flow branch and the others of said flow branches are secondary flow branches.

37. The arrangement as recited in claim 36, wherein said primary flow branch has a cross-sectional size that is larger than that of each of said secondary flow branches.

38. The arrangement as recited in claim 36, wherein said flow outlet of said primary flow branch is displaced downstream of said flow outlets of said secondary flow branches relative to the direction of gas flow past said external surface of said wall portion.

39. The arrangement as recited in claim 36, wherein said secondary flow branches are aligned with one another in a plane extending in inclined relation relative to said external surface of said wall portion.

40. In a turbine airfoil having leading and trailing edges and opposite side walls defining pressure and suction sides and merging together at said leading and trailing edges to define a hollow interior chamber for supplying cooling air flow, said side walls extending generally in the direction of gas flow past said airfoil from said leading edge to said trailing edge of said airfoil, a film cooling hole arrangement comprising:
   (a) a portion of at least one of said side walls, said side wall portion having an external surface extending in the direction of gas flow past said airfoil and an internal surface spaced from said external surface and exposed to flow communication with said hollow interior chamber; and
   (b) means defining a plurality of separate multi-outlet holes formed in spaced non-communicative flow relation to one another through said side wall portion to permit flow of cooling air from said hollow interior chamber to said external surface of said side wall;
   (c) each of said separate multi-outlet holes including a flow inlet defined at said internal surface and communicating with said hollow interior chamber, at least a pair of flow outlets defined at said exterior surface, and at least a pair of flow branches extending through said side wall portion between said flow inlet and said flow outlets, said flow branches merging and intersecting with one another at said flow inlet.

41. The arrangement as recited in claim 40, wherein said flow branches of each said hole merge and intersect with one another at said flow inlet to define said hole in a generally V-shaped configuration.

42. The arrangement as recited in claim 40, wherein each said hole includes a pair of flow inlets at said internal surface of said side wall portion for receiving the cooling air flow, said flow branches extending through said side wall portion and between said flow inlets and said flow outlets, said flow branches merging and intersecting with one another at a location intermediate between and spaced from said flow inlets and outlets to define said hole in a generally X-shaped configuration.

43. The arrangement as recited in claim 40, wherein said flow outlets of each said hole are displaced downstream of said flow inlet relative to the direction of gas flow past said external surface of said side wall portion.

44. The arrangement as recited in claim 40, wherein said flow branches of each said hole extend through said side wall portion in inclined relation to said external surface of said side wall portion.

45. In a turbine airfoil having leading and trailing edges and opposite side walls defining pressure and suction sides and merging together at said leading and trailing edges to define a hollow interior chamber for supplying cooling air flow, said side walls extending generally in the direction of gas flow past said airfoil from said leading edge to said trailing edge of said airfoil, a film cooling hole arrangement comprising:
   (a) a portion of at least said trailing edge, said trailing edge portion having an external surface and an internal surface spaced from said external surface and exposed to flow communication with said hollow interior chamber; and
   (b) means defining a plurality of separate multi-outlet holes formed in spaced non-communicative flow relation to one another through said trailing edge portion to permit flow of cooling air from said hollow interior chamber to said external surface of said trailing edge portion;
   (c) each of said separate multi-outlet holes including a flow inlet defined at said internal surface and communicating with said hollow interior chamber, at least a pair of flow outlets defined at said exterior surface, and at least a pair of flow branches extending through said trailing edge portion between said flow inlet and said flow outlets, said flow branches merging and intersecting with one another at said flow inlet.

46. The arrangement as recited in claim 45, wherein said flow branches of each said hole merge and intersect with one another at said flow inlet to define said hole in a generally V-shaped configuration.

47. The arrangement as recited in claim 45, wherein each said hole includes a pair of flow inlets at said internal surface of said trailing edge portion for receiving the cooling air flow, said flow branches extending through said trailing edge portion and between said flow inlets and said flow outlets, said flow branches merging and intersecting with one another at a location intermediate between and spaced from said flow inlets and outlets to define said hole in a generally X-shaped configuration.

48. In a turbine airfoil having an outer tip end wall and opposite side walls connected to said outer tip end wall and defining pressure and suction sides and merging together at leading and trailing edges to define a hollow interior chamber for supplying cooling air flow, said side walls extending generally in the direction of gas flow past said airfoil from said leading edge to said trailing edge of said airfoil, a film cooling hole arrangement comprising:
   (a) a portion of at least said outer tip end wall, said outer end wall portion having an external surface and an internal surface spaced from said external surface and exposed to flow communication with said hollow interior chamber; and
   (b) means defining a plurality of separate multi-outlet holes formed in spaced non-communicative flow relation to one another through said outer end wall portion to permit flow of cooling air from said hollow interior chamber to said external surface of said outer end wall portion;
   (c) each of said separate multi-outlet holes including a flow inlet defined at said internal surface and communicating with said hollow interior chamber, at least a pair of flow outlets defined at said exterior surface, and at least a pair of flow branches extending through said outer end wall portion between said flow inlet and said flow outlets, said flow branches merging and intersecting with one another at said flow inlet.

49. The arrangement as recited in claim 48, wherein said flow branches of each said hole merge and intersect with one another at said flow inlet to define said hole in a generally V-shaped configuration.

50. The arrangement as recited in claim 48, wherein each said hole includes a pair of flow inlets at said internal surface of said outer end wall portion for receiving the cooling air flow, said flow branches extending through said outer end portion and between said flow inlets and said flow outlets, said flow branches merging and intersecting with one another at a location intermediate between and spaced from said flow inlets and outlets to define said hole in a generally X-shaped configuration.

51. The arrangement as recited in claim 48, wherein said holes are aligned in a row extending substantially parallel to one of said side walls.

52. The arrangement as recited in claim 48, wherein said holes are aligned in a pair of rows extending substantially parallel to said respective side walls.

53. The arrangement as recited in claim 48, wherein said holes are aligned in a pair of rows extending substantially parallel to said respective side walls and adjacent opposite portions of said peripheral edge.

54. The arrangement as recited in claim 48, wherein said blade has a continuous peripheral edge surrounding and extending outwardly from said outer end wall.

55. The arrangement as recited in claim 54, wherein said holes are aligned in a row extending substantially parallel to one of said side walls and adjacent a portion of said peripheral edge.

* * * * *